United States Patent
Raghavan et al.

(10) Patent No.: US 10,862,546 B2
(45) Date of Patent: Dec. 8, 2020

(54) COORDINATED TRANSMISSION IN MILLIMETER WAVE SYSTEMS

(71) Applicant: QUALCOMM Incorporated, San Diego, CA (US)

(72) Inventors: Vasanthan Raghavan, West Windsor Township, NJ (US); Jung Ryu, Fort Lee, NJ (US); Junyi Li, Chester, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/241,559

(22) Filed: Jan. 7, 2019

(65) Prior Publication Data
US 2019/0253106 A1 Aug. 15, 2019

Related U.S. Application Data

(60) Provisional application No. 62/630,042, filed on Feb. 13, 2018.

(51) Int. Cl.
*H04B 7/024* (2017.01)
*H04B 7/08* (2006.01)
(Continued)

(52) U.S. Cl.
CPC .............. *H04B 7/024* (2013.01); *H04B 7/063* (2013.01); *H04B 7/0617* (2013.01);
(Continued)

(58) Field of Classification Search
CPC ........ H04B 7/024; H04B 7/063; H04B 7/084; H04B 7/0639; H04B 7/0617;
(Continued)

(56) References Cited

U.S. PATENT DOCUMENTS

2013/0258886 A1\* 10/2013 Chen .................... H04B 7/0417
370/252
2016/0352487 A1 12/2016 Chen et al.
(Continued)

OTHER PUBLICATIONS

"3rd Generation Partnership Project; Technical Specification Group Radio Access Network; Study on New Radio Access Technology Physical Layer Aspects (Release 14)", 3GPP Standard; Technical Report; 3GPP TR 38.802, 3rd Generation Partnership Project (3GPP), Mobile Competence Centre; 650, Route Des Lucioles; F-06921 Sophia-Antipolis Cedex; France, vol. RAN WG1, No. V14.2.0, Sep. 26, 2017 (Sep. 26, 2017), XP051337340, [retrieved on Sep. 26, 2017], pp. 1-143.
(Continued)

*Primary Examiner* — Fitwi Y Hailegiorgis
(74) *Attorney, Agent, or Firm* — Patterson & Sheridan, LLP

(57) ABSTRACT

Certain aspects of the present disclosure provide techniques for coordinated transmissions in certain systems, such as millimeter wave (mmW) systems. A method of wireless communication by a user equipment (UE) generally includes providing an indication to a plurality of base stations (BSs) of one or more selected beams for transmission by each of the plurality of BSs. The method includes determining one or more co-phase factors. The method includes receiving a coordinated transmission from the plurality of BSs based on the one or more selected beams and the one or more co-phase factors. A method by a BS generally includes receiving the indication from the UE of the one or more selected beam, determining one or more co-phase correction factors, and sending a coordinated transmission to the UE based, at least in part, on the one or more selected beam and the one or more co-phase correction factors.

24 Claims, 14 Drawing Sheets

(51) Int. Cl.
*H04W 56/00* (2009.01)
*H04B 7/06* (2006.01)
*H04B 17/382* (2015.01)
*H04B 7/0456* (2017.01)

(52) U.S. Cl.
CPC ......... *H04B 7/0636* (2013.01); *H04B 7/0639* (2013.01); *H04B 7/0695* (2013.01); *H04B 7/084* (2013.01); *H04B 7/0857* (2013.01); *H04B 17/382* (2015.01); *H04W 56/002* (2013.01); *H04B 7/046* (2013.01)

(58) Field of Classification Search
CPC .. H04B 7/0695; H04B 17/382; H04B 7/0636; H04B 7/0857; H04B 7/046; H04W 56/002
USPC .......................................... 375/262; 370/252
See application file for complete search history.

(56) References Cited

U.S. PATENT DOCUMENTS

2018/0042028 A1    2/2018  Nam et al.
2018/0167116 A1*   6/2018  Rahman ............... H04B 7/0645

OTHER PUBLICATIONS

International Search Report and Written Opinion—PCT/US2019/012651—ISA/EPO—dated Mar. 28, 2019.
Samsung: "Multibeam Transmission for PDCCH", 3GPP Draft, R1-1713614 Multibeam Transmission for PDCCH, 3Rd Generation Partnership Project (3GPP), Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017 (Aug. 20, 2017), XP051316414, pp. 1-6, Retrieved from the Internet: URL:http://www.3gpp.org/ftp/Meetings_3GPP_SYNC/RAN1/Docs/ [retrieved on Aug. 20, 2017].

* cited by examiner

COORDINATED TRANSMISSION IN MILLIMETER WAVE SYSTEMS

CROSS-REFERENCE TO RELATED APPLICATION & PRIORITY CLAIM

This application claims benefit of and priority to U.S. Provisional Patent Application Ser. No. 62/630,042, filed Feb. 13, 2018, herein incorporated by reference in its entirety as if fully set forth below and for all applicable purposes.

BACKGROUND

Field of the Disclosure

Aspects of the present disclosure relate to wireless communications, and more particularly, to techniques for coordinated transmission in certain systems, such as in millimeter wave (mmW) systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in 5G-NR), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node which may be referred to as a BS, next generation NodeB (gNB or gNodeB), transmission reception point (TRP), etc. A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. 5G-NR is an example of an emerging telecommunication standard. 5G-NR is a set of enhancements to the LTE mobile standard promulgated by 3GPP. 5G-NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for to coordinated transmission in certain systems, such as in millimeter wave (mmW) systems.

Certain aspects of the present disclosure provide a method for wireless communication that may be performed, for example, by a user equipment (UE). The method generally includes providing an indication to a plurality of base stations (BSs) of one or more selected beams for transmission by each of the plurality of BSs. The method includes determining one or more co-phase factors. The method includes receiving a coordinated beamformed transmission from the plurality of BSs based on the one or more selected beams and the co-phase factors.

Certain aspects of the present disclosure provide a method for wireless communication that may be performed, for example, by a BS. The method generally includes receiving an indication from a UE of one or more selectee beams for transmission by the BS. The method includes determining one or more co-phase factors. The method includes sending a coordinated beamformed transmission to the UE based, at least in part, on the one or more selected beams and the one or more co-phase factors.

Certain aspects of the present disclosure provide an apparatus for wireless communication. The apparatus generally includes means for providing an indication to a plurality of BSs of one or more selected beams for transmission by each of the plurality of BSs. The apparatus includes means for determining one or more co-phase factors. The apparatus includes means for receiving a coordinated beamformed transmission from the plurality of BSs based on the one or more selected beams and the co-phase factors.

Certain aspects of the present disclosure provide an apparatus for wireless communication. The apparatus generally includes means for receiving an indication from a UE of one or more selectee beams for transmission by the apparatus. The apparatus includes means for determining one or more co-phase factors. The apparatus includes means for sending a coordinated beamformed transmission to the UE based, at least in part, on the one or more selected beams and the one or more co-phase factors.

Certain aspects of the present disclosure provide an apparatus for wireless communication. The apparatus generally includes a transmitter configured to provide an indication to a plurality of BSs of one or more selected beams for transmission by each of the plurality of BSs. The apparatus generally includes at least one processor coupled with a memory and configured to determine one or more co-phase factors. The apparatus includes a receiver configured to receive a coordinated beamformed transmission from the plurality of BSs based on the one or more selected beams and the co-phase factors.

Certain aspects of the present disclosure provide an apparatus for wireless communication. The apparatus generally includes a receiver configured to receive an indication from a UE of one or more selectee beams for transmission by the apparatus. The at least one processor coupled with a memory and configured to determine one or more co-phase factors. The apparatus includes a transmitter configured to send a coordinated beamformed transmission to the UE based, at least in part, on the one or more selected beams and the one or more co-phase factors.

Certain aspects of the present disclosure provide a computer readable medium having computer executable code stored thereon for wireless communication. The computer readable medium generally includes code for providing an indication to a plurality of B Ss of one or more selected beams for transmission by each of the plurality of BSs. The computer readable medium includes code for determining one or more co-phase factors. The computer readable medium includes code for receiving a coordinated beamformed transmission from the plurality of BSs based on the one or more selected beams and the co-phase factors.

Certain aspects of the present disclosure provide a computer readable medium having computer executable code stored thereon for wireless communication. The computer readable medium generally includes code for receiving an indication from a UE of one or more selectee beams for transmission by a BS. The computer readable medium includes code for determining one or more co-phase factors. The computer readable medium includes code for sending a coordinated beamformed transmission to the UE based, at least in part, on the one or more selected beams and the one or more co-phase factors.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
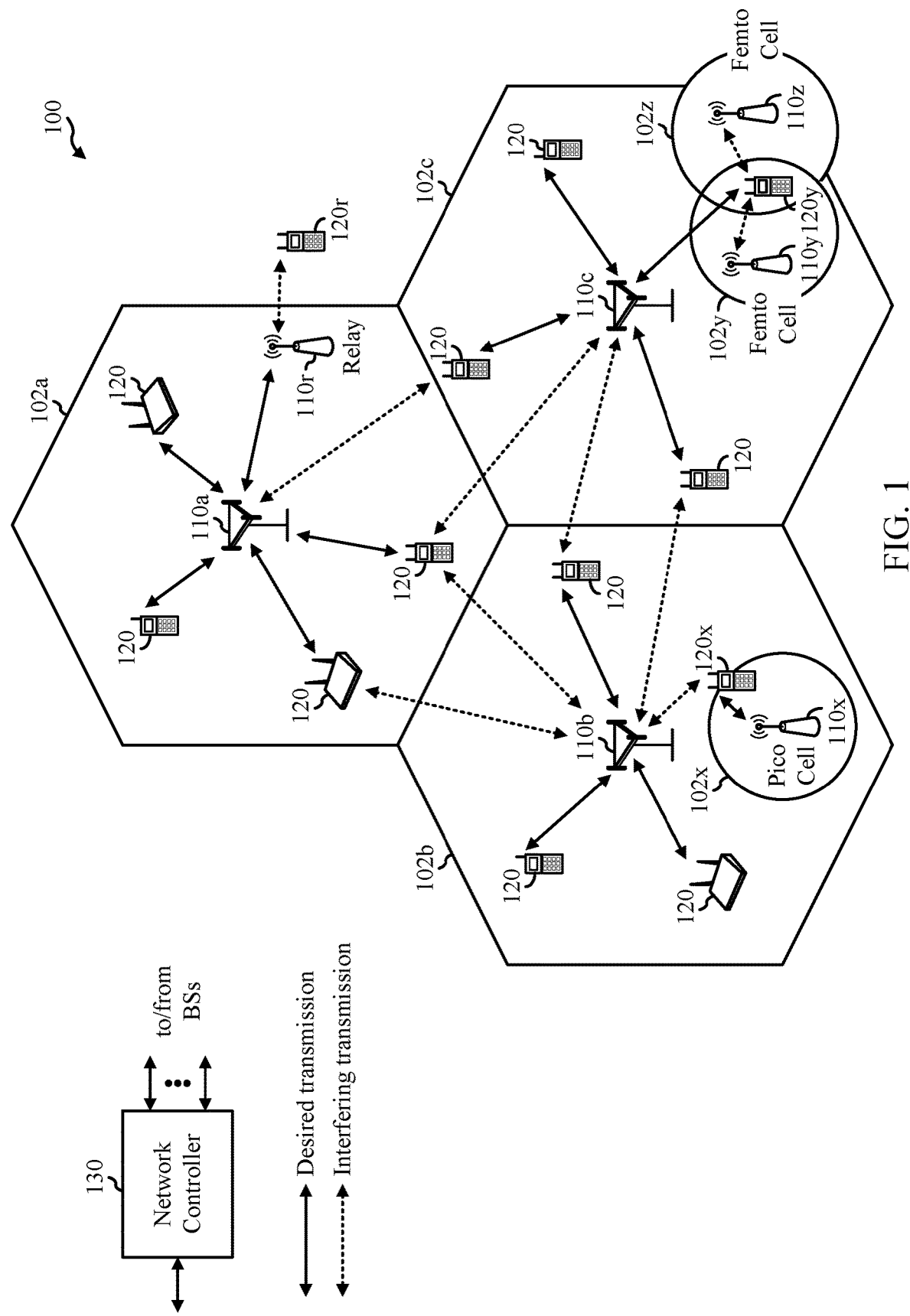
FIG. 1 is a block diagram conceptually illustrating an example telecommunications system, in accordance with certain aspects of the present disclosure.

Aspects of the present disclosure provide apparatus, methods, processing systems, and computer readable mediums for 5G-NR. 5G-NR may support various wireless communication services, such as enhanced mobile broadband (eMBB) targeting wide bandwidth (e.g. 80 MHz or beyond), millimeter wave (mmW) targeting high carrier frequency (e.g. 25 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Typically, in mmW wave systems, signaling is beamformed and transmissions are from a single device, such as a base station (BS) (e.g., a Next Generation Node B (gNB)), to a single device, such as a user equipment (UE). In some cases, however, transmissions may be coordinated, for example, from multiple BS (e.g., gNBs or TRPs) to a single UE.

Accordingly, aspects of the present disclosure provide techniques and apparatus for coordinated beamformed transmission in certain systems, such as mmW systems. For example, a UE can determine the one or more selected beams and co-phase factors and provide the selected beams and co-phase factors to the BSs to aid the BSs in the coordinated beamforming. The UE can also use co-phase factors, selected beams, as well as signal strength measurements to determine the beam at the UE for receiving coordinated beamformed transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as 5G-NR, Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the Third Generation Partnership Project (3GPP). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless communication network 100 may be a New Radio (NR) or 5G network that supports millimeter wave (mmW) communications. A UE 120 can participate in beam training with multiple different BSs 110 to determine the beams for transmission for each of the BSs 110. The UE 120 also determines co-phase factors and may provide the co-phase factors to the BSs 110. The UE 120 can also use co-phase factors, selected beams, as well as signal strength measurements to determine the beam at the UE for receiving coordinated transmissions. The BSs 110 can select beamforming parameters based on the selected beam and co-phase factors received from the UE 120 and send a coordinated transmission to the UE 120.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and Next Generation Node B (gNB or gNodeB), access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Figure 2:
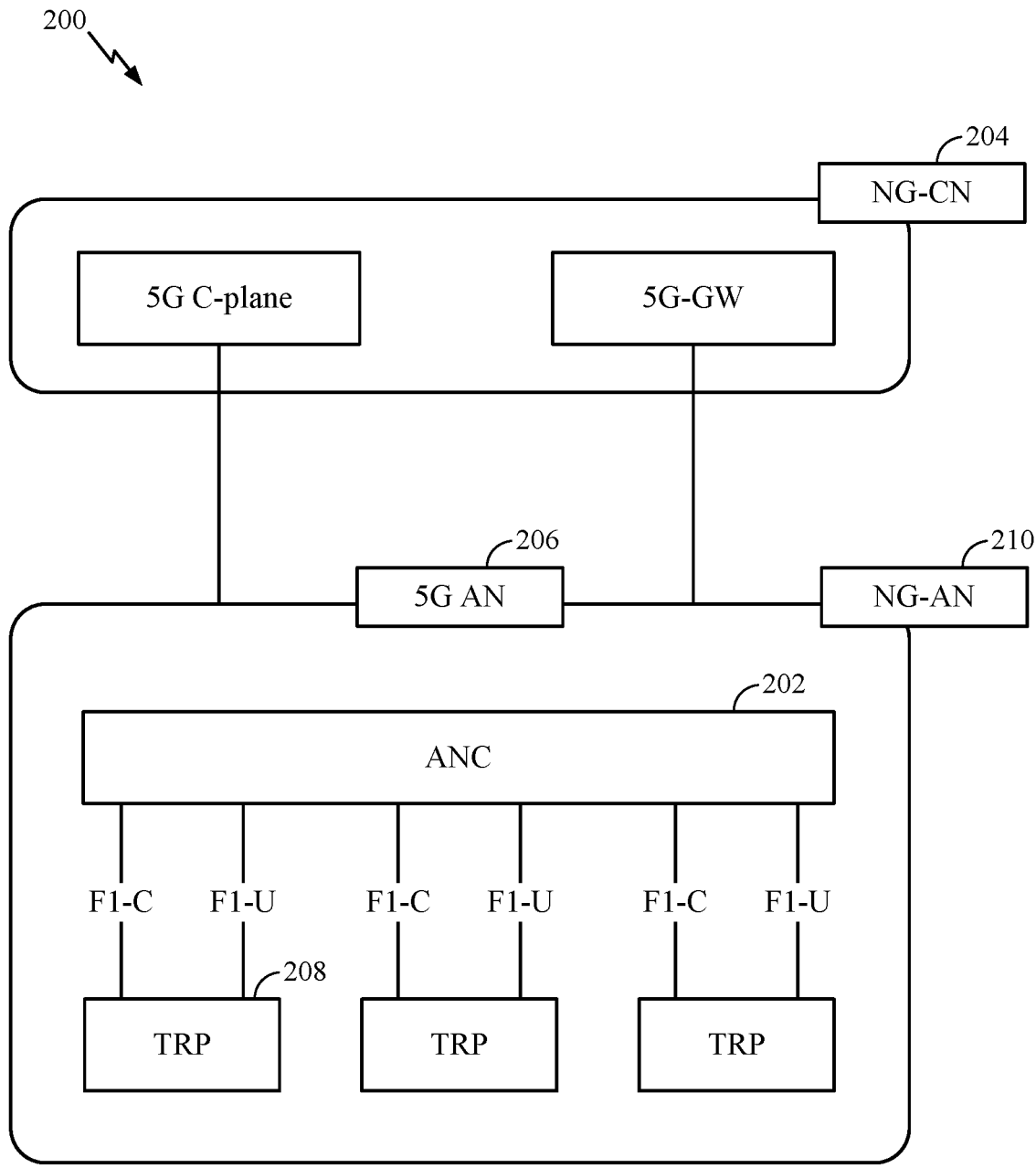
FIG. 2 is a block diagram illustrating an example logical architecture of a distributed radio access network (RAN), in accordance with certain aspects of the present disclosure.

In FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
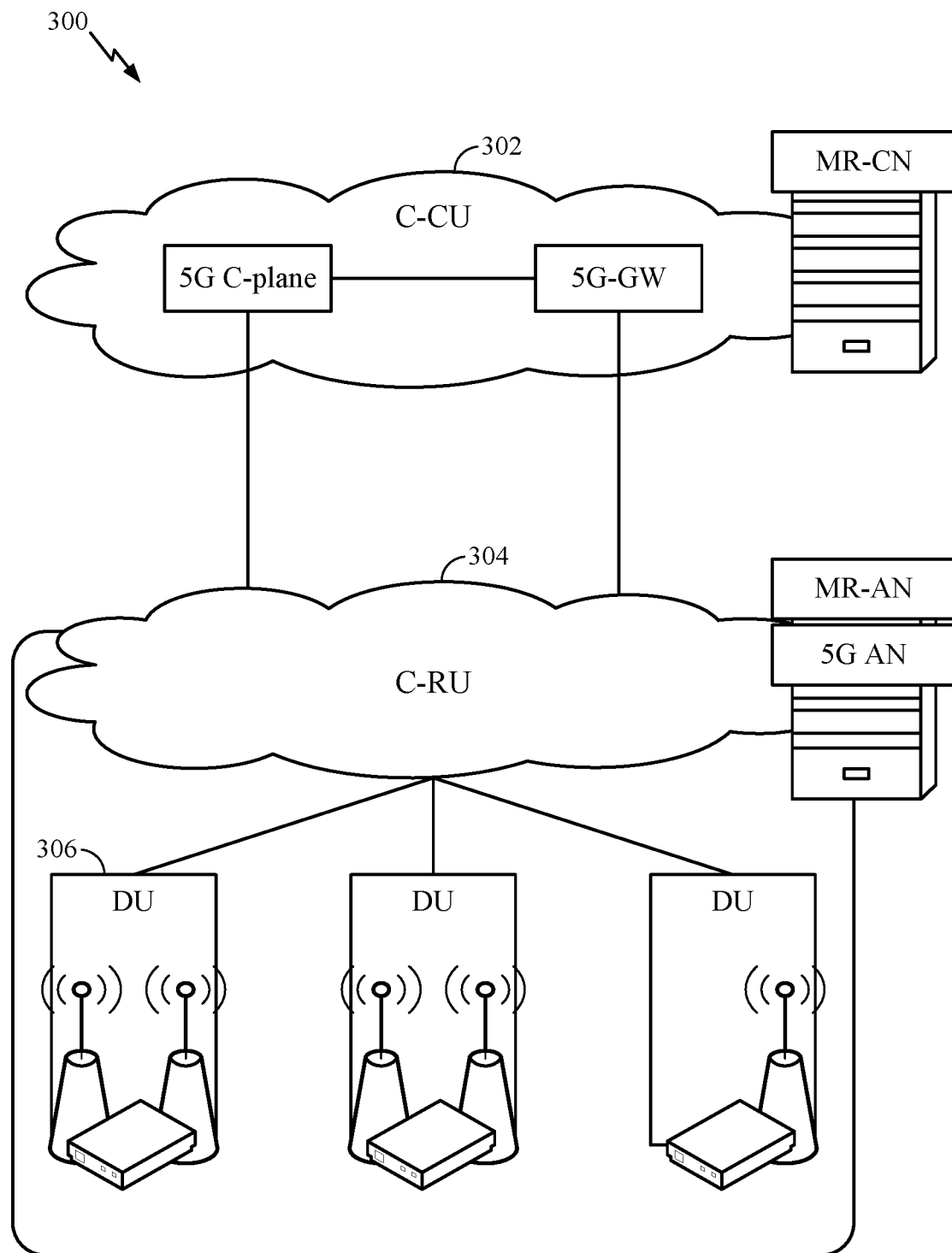
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
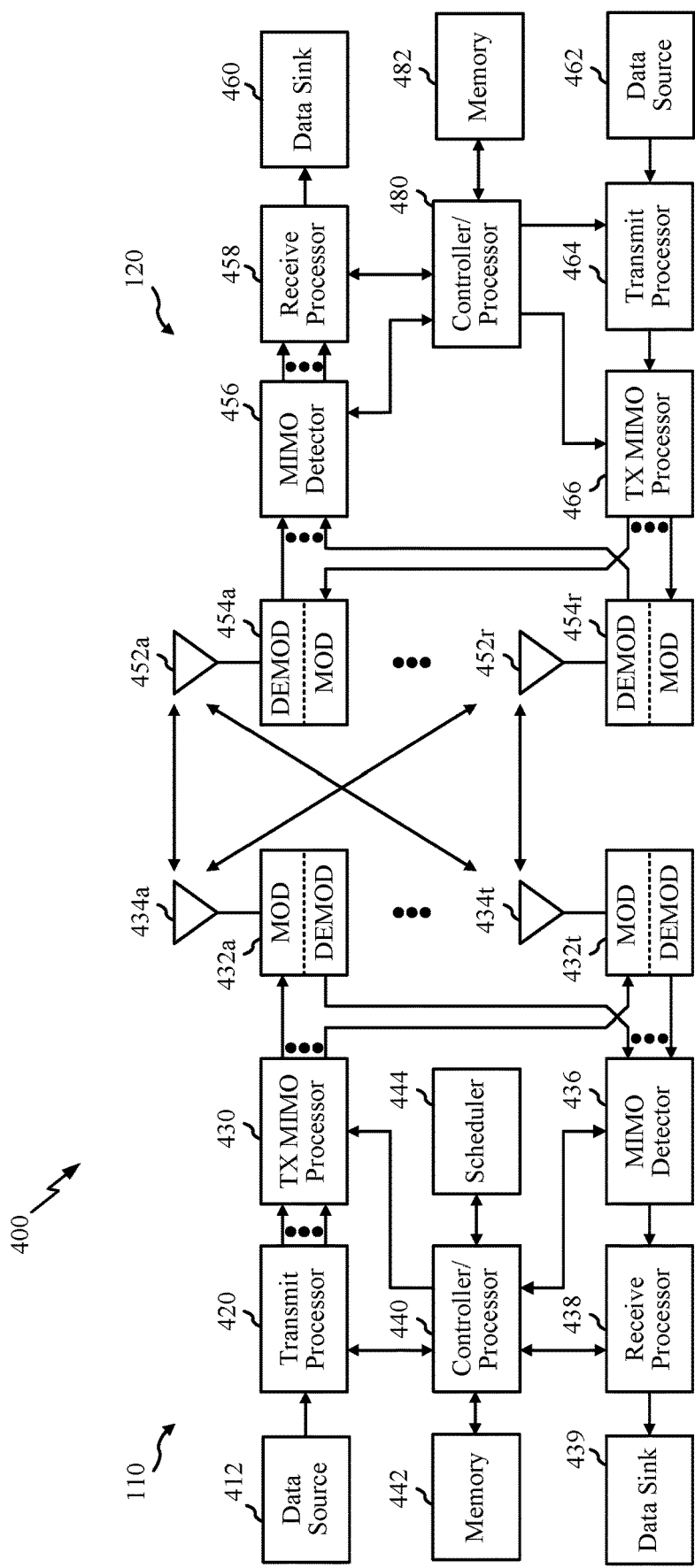
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein and illustrated with reference to FIGS. 8-9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
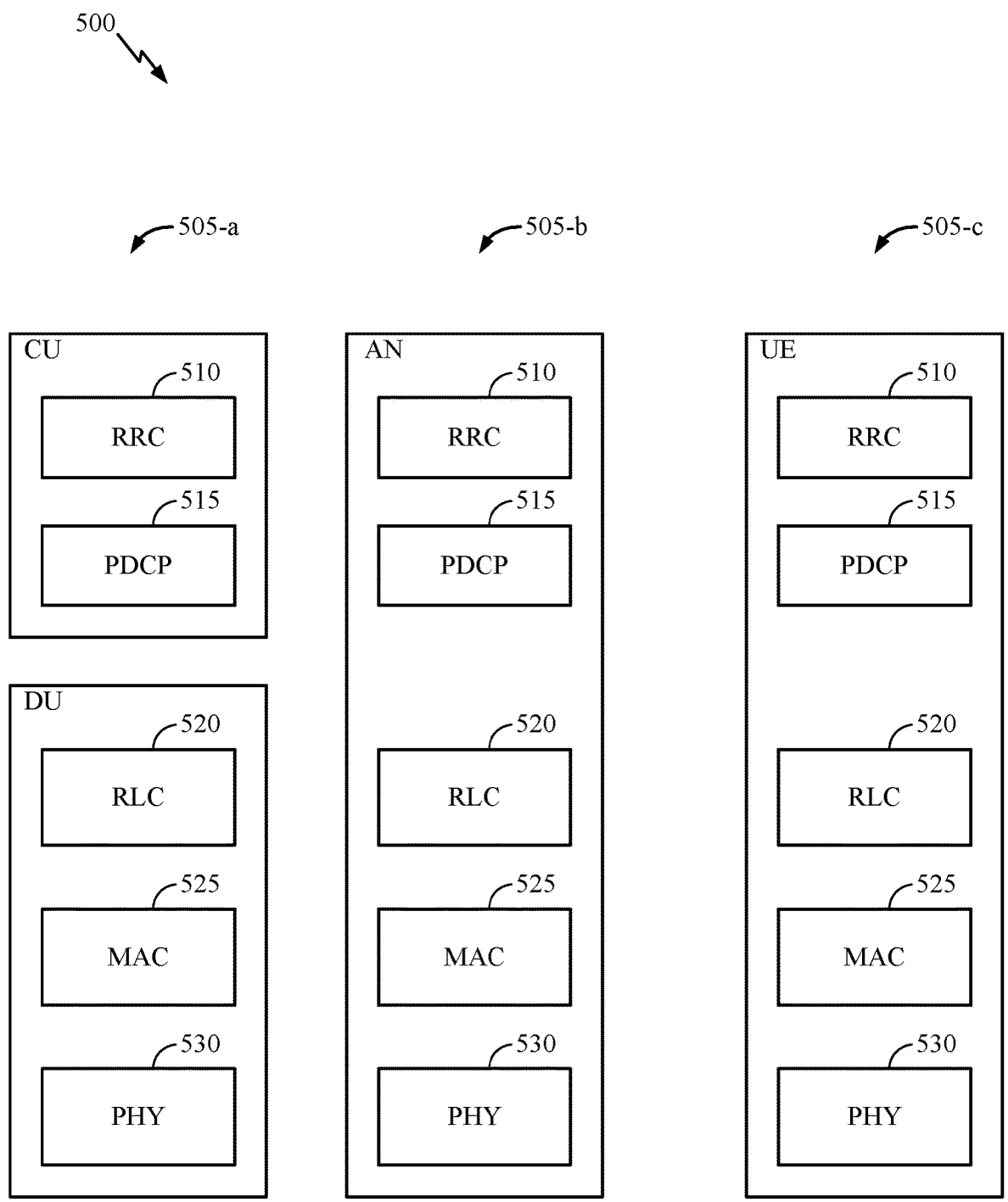
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
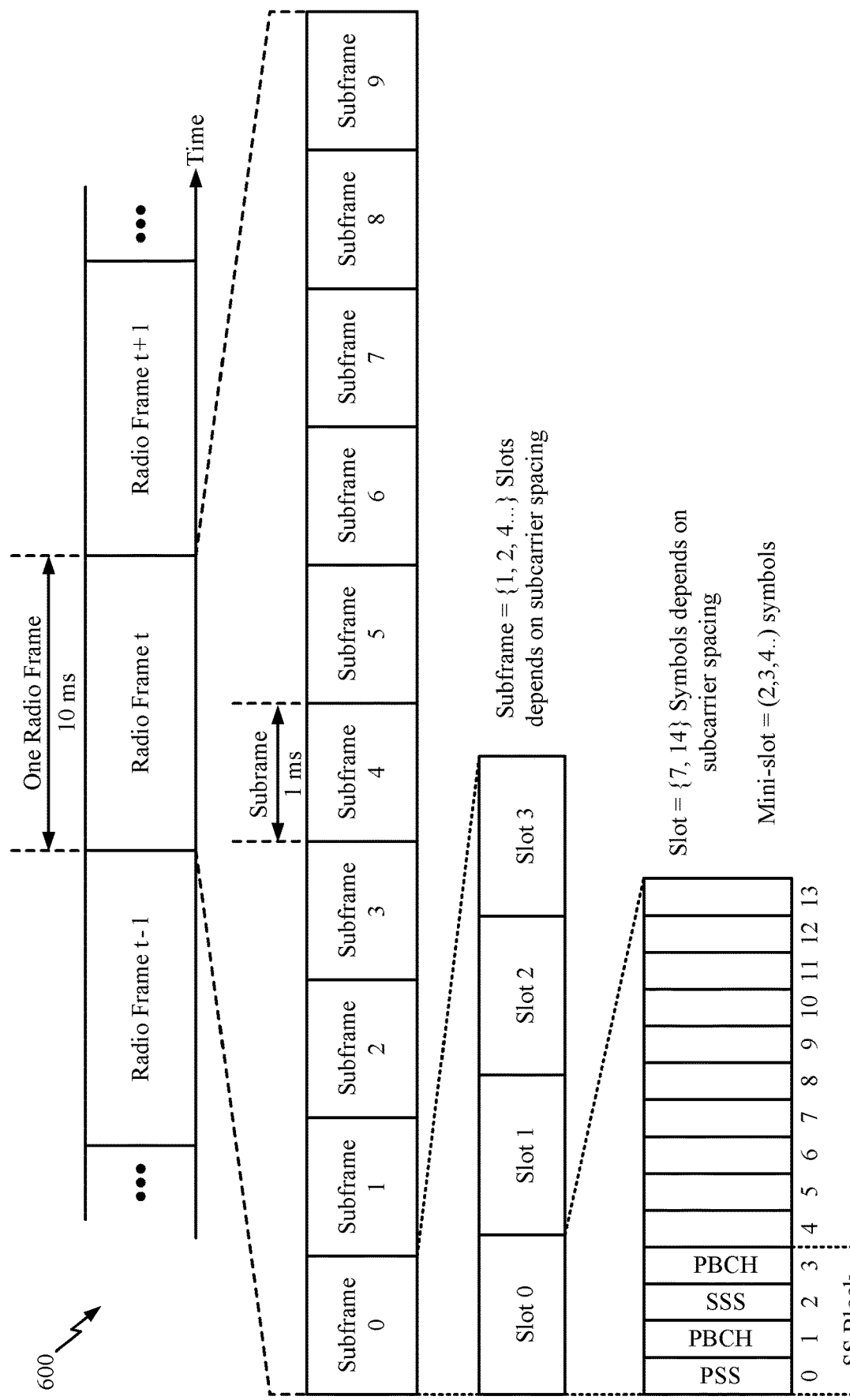
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Coordinated Transmission in mmW Systems

Aspects of the present disclosure provide apparatus, methods, processing systems, and computer readable mediums for 5G-NR systems. As mentioned above, NR supports various wireless communication services, including millimeter wave (mmW) targeting high carrier frequency (e.g. 25 GHz or beyond).

In mmW systems, signaling may be beamformed. The signaling may be from a single device to another device. For example, from a single base station (BS) to a single user equipment (UE). For downlink beamforming, the BS beamforms along a beamforming vector f, and the UE receives along a vector g. In some examples, a low-complexity approximation to f and g are used for beam steering along the dominant (e.g., strongest) angle-of-departure (AoD) and angle-of-arrival (AoA) of the channel H.

Figure 7:
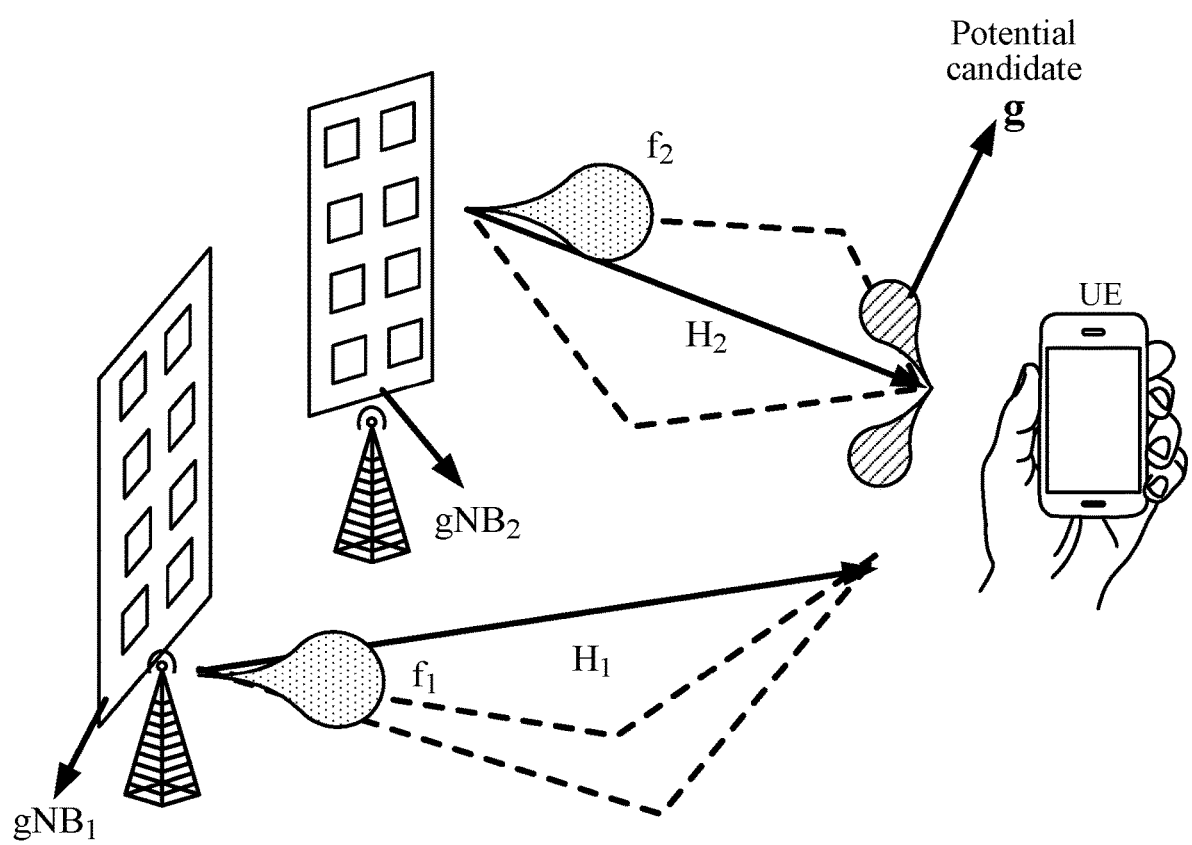
FIG. 7 is a diagram showing an example of coordinated transmission by two BSs to a UE, in accordance with certain aspects of the present disclosure.

In some cases, transmissions may be coordinated. In other words, multiple transmission points may transmit the same signal to a single device. The coordinated transmissions can be multiple BSs (e.g., Next Generation Node Bs (gNBs)) or multiple transmission reception points (TRPs) (e.g., such as different antennas, antenna arrays, or antenna panels of a single BS), to a single UE. FIG. 7 is a diagram showing an example of coordinated transmission by two BSs (gNB$_1$ and gNB$_2$) to a UE, in accordance with certain aspects of the present disclosure. As shown in FIG. 7, the gNB$_1$ and gNB$_2$ both transmit a shared signal to the UE. The signals may be transmitted simultaneously or, in some cases, at different times. The gNB$_1$ transmits the signal over the beamforming vector f$_1$ and channel H$_1$ and the gNB$_2$ transmits the signal over the beamforming vector f$_2$ and channel H$_2$. The UE selects the beamforming vector g for reception from both of the gNBs. The beamforming vectors may be selected in an attempt to maximize the receive signal-to-noise ratio (SNR), maximize throughput, and/or another appropriate metric. Although FIG. 7 shows coordinated transmission by two gNBs, the coordinated transmission can be by any number of multiple gNBs or TRPs.

Co-phasing is one approach to achieve high array gain from antennas. Co-phasing involves using multiple antennas at a certain distance apart (e.g., a one-half wavelength or more) and feeding the beam weights for the antennas in two or more distinct directions but in-phase such that the signal energy is enhanced. Co-phasing may be equivalent to finding a beamforming weight vector that maximizes SNR.

Accordingly, aspects of the present disclosure provide techniques and apparatus for coordinated transmission in certain systems, such as mmW systems. According to certain aspects, separate beam training can be performed by the transmission points with the UE to identify beam pairs (e.g., best or strongest pairs, or beam satisfying a strength/quality threshold) of transmit beams used by each of the transmission points involved in the coordinated beamformed transmissions and receive beams at the UE for receiving the coordinated beamformed transmission. The UE feeds back the selected one or more transmit beams (e.g., the beam index and, optionally, the associated signal measurements) to the transmission points. In addition, the UE can determine co-phase factors (e.g., frequency and/or phase correction factors) and provide the co-phase factors to the BSs. For example, based on the beam trainings, the UE can determine post-beamformed complex signal/symbol estimates and correlate the estimates to determine the co-phase factors for the transmission points. The BSs can use the indicated co-phase factors and beams to form the coordinated beamformed transmission. The UE can also determine co-phase factors that the UE can use, along with the determined receive beams, to form a receive beam, such as a matched filtering beam, for receiving the coordinated beamformed transmission. In some examples, the BSs and the UE perform another UE-specific beam training, using the selected beam pairs, for the UE to determine co-phase factors for the receive beam.

Figure 8:
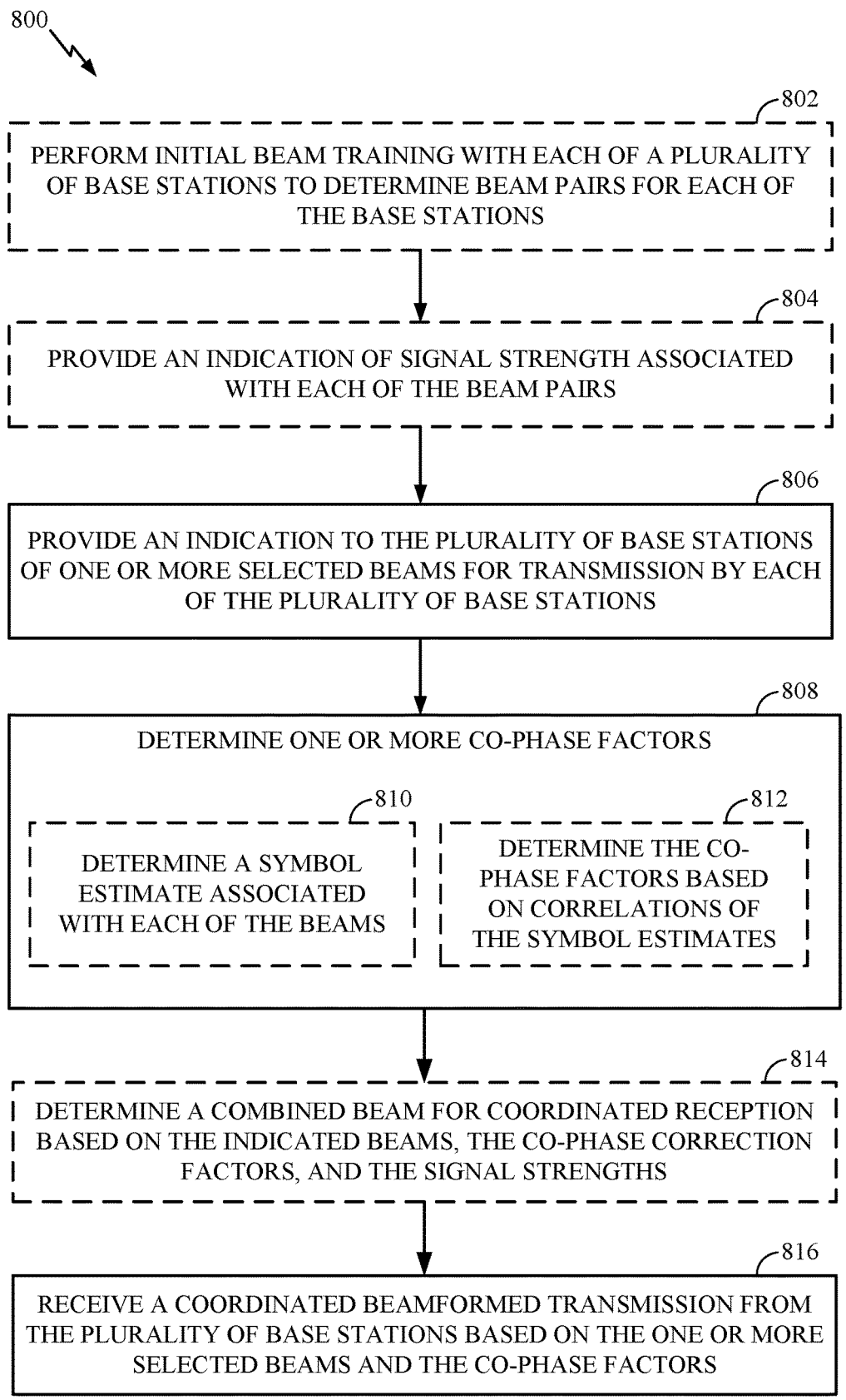
FIG. 8 is a flow diagram illustrating example operations by a UE for coordinated transmission, in accordance with certain aspects of the present disclosure.

FIG. 8 is a flow diagram illustrating example operations 800 for wireless communications, in accordance with certain aspects of the present disclosure. The operations 800 may be performed by a UE (e.g., such as one of the UEs 120 illustrated in the wireless communication network 100 in FIG. 1), for example, by circuity components within the UE. The TX MIMO processor 466 of FIG. 4 may serve as an exemplary processor for the operations 800 described herein. Alternatively, MIMO processor 466 may have dedicated or shared circuitry for determining the co-phase correction factors and other processors, such as the controller/processor 480, MIMO detector 456, transmit processor 464, and/or receive processor 458 may also be used to perform a portion of the operations 800 described herein. Operations for signaling, providing, indicating, etc., can be performed by transmit chain circuitry of the UE 120, shown in FIG. 4, which may include the controller/processor 480, data source 662, transmit processor 464, TX MIMO processor 466, modulator(s) 454a-454r, and/or antenna(s) 454a-454r. Operations for receiving can be performed by the receive chain circuitry of the UE 120 which may include the controller/processor 480, receive processor 458, MIMO detector 456, demodulator(s) 454a-454r, and/or antenna(s) 454a-454r.

The operations 800 may begin, at 806, by providing an indication to a plurality of BSs (or a plurality of TRPs) of one or more selected beams (e.g., best or strongest beams, or beams satisfying a strength/quality threshold) for transmission (e.g., for single-user transmission) by each of the plurality of BSs (e.g., TRPs). As shown in FIG. 8, optionally, at 802, to determine the one or more selected beams, the UE may participate in an initial beam training (e.g., also referred to as a beam alignment procedure) with each of the plurality of BSs separately. The BSs may send a signal with beam sweeping to the UE as part of the beam training procedure. For example, the BSs may sweep the beam through their beam codebooks (e.g., finite-precision codebooks), which may be directional beams or other. In some examples, the beam swept signal may be a secondary synchronization signal (SSS). From the beam training, the UE can identify the one or more selected beams for the plurality of BSs. The UE may provide an index identifying the selected beams. For two gNBs, such as the gNB$_1$ and gNB$_2$ illustrated in FIG. 7, gNB$_1$ may have a codebook of size M denoted as F$_1$={c$_1$, . . . c$_M$} and gNB$_2$ may have a codebook of size N denoted as F$_2$={d$_1$, . . . d$_M$}. The selected beam for gNB$_1$ may be denoted f$_{1,opt}$=c$_i$ and the selected beam for gNB$_2$ may be denoted f$_{2,opt}$=d$_j$. In some examples, the codebook indices may represent a rank-1 approximation of the respective channel.

During the beam training, the UE can also select (e.g., determine the strongest or best, or beam satisfying a strength/quality threshold) the beam at the UE for receiving the signals. Thus, the UE can identify beam pairs (e.g., best or strongest pairs, or beam pairs satisfying a strength/quality threshold) for each of the plurality of BSs. The UE may use a codebook of size P denoted a $G_1=\{e_1, \ldots e_M\}$. The beam identified at the UE for receiving from $gNB_1$, based on the beam training with $gNB_1$, may be denoted $g_{1,opt}=e_k$. The beam identified at the UE for receiving from $gNB_2$, based on the beam training with $gNB_2$, may be denoted $g_{2,opt}=e_l$.

As shown in FIG. 8, optionally at 804, the UE may also provide an indication of the signal strength associated with each of the best beams (or best beam pairs, or beams or beam pairs satisfying a strength/quality threshold) to the plurality of BSs. For example, the UE may perform signal strength measurements of the signals transmitted during the beam training. The indicated signal strength may include a reference signal received power (RSRP), a reference signal received quality (RSRQ), a signal-to-noise ratio (SNR), and/or a signal-to-interference and noise ratio (SINR) associated with each of the best beams (or beam satisfying a strength/quality threshold). The indicated signal strength measurements may be used by the BSs, for example, to determine a modulation and coding scheme (MCS) for transmissions to the UE. In the example of the two gNBs in FIG. 7, for RSRP measurements, the RSRP for the selected beam pair with the $gNB_1$ may be denoted $RSRP_{ki}$ and the RSRP for the selected beam pair with the $gNB_2$ may be denoted $RSRP_{lj}$.

At 808, the UE determines one or more co-phase factors (e.g., co-phasing factors or co-phase correction factors). The UE may provide an indication of the one or more co-phase factors to the plurality of BSs. The co-phase factors can be provided for a subset or all of the gNBs. The co-phase factors may correspond to modulo quantization constraints. As shown in FIG. 8, determining the one or more co-phase factors may include, at 810, after identifying the one or more beams for transmission by the BS, the UE can determine a symbol estimate (e.g., the post-beamformed complex signal/symbol estimate) associated with each of the one or more selected beams (e.g., for the best beam pair, or beam satisfying a strength/quality threshold, with each of the plurality of gNBs).

In some examples, the UE could feed back the symbol estimates to the gNBs, and the gNBs could use the symbol estimates to determine co-phase factors. In the examples described herein, however, the UE uses the symbol estimates to determine the co-phase factors and feeds back the co-phase factors to the gNBs, as described in more detail below. The symbol estimates may be based on the selected beam pairs, the channel H, the pre-beamforming SNR of the link between the UE and gNBs, ρ, and the additive noise added at the UE when the reception is made with a low noise amplifier n (e.g., a random quantity). The symbol estimate for the $gNB_1$ can be obtained based on the Eq. (1) below and the symbol estimate for the $gNB_2$ can be obtained based on the Eq. (2) below.

$$\widehat{S_1} = e_k^H \cdot \qquad \qquad \text{Eq. (1)}$$

$$\widehat{S_2} = e_l^H \cdot \qquad \qquad \text{Eq. (2)}$$

As shown in FIG. 8, determining the one or more co-phase factors may include, at 812, correlating (e.g., a plurality of correlations) the complex signal/symbol estimates to obtain the co-phase factors according to Eq. (3) below.

$$\emptyset = \angle \widehat{S_1} \cdot \widehat{S_2} \qquad \qquad \text{Eq. (3)}$$

In some cases, the co-phase factors may change dynamically over time, for example, due to phase noise and/or carrier frequency offset (CFO). Thus, after the initial alignment, which may be performed at different times, the UE may perform another UE-specific beam training with the plurality of BSs for a separate estimation of the co-phase factors. The UE-specific beam training may be used to refine the co-phase factors determined using the Eqs. (1)-(3). The UE-specific beam training may use the selected beam pairs over a contiguous set of symbols and frequency resources. The UE-specific beam training may be performed over two sub-symbols. The UE can estimate the co-phase factors with noise and/or CFO coherence.

As shown in FIG. 8, optionally at 814, the UE also determines the combining beam g (e.g., also referred to as the matched filtering beam) for reception of the coordinated transmission based on the selected beam pairs, the co-phase factors, and the signal strengths. The combining beam can be determined according to the Eq. (4) below.

$$g = \frac{\sqrt{RSRP_{ki}^{(1)}} \cdot e_k + e^{j\phi} \cdot \sqrt{RSRP_{lj}^{(2)}} \cdot e_l}{\left\| \sqrt{RSRP_{ki}^{(1)}} \cdot e_k + e^{j\phi} \cdot \sqrt{RSRP_{lj}^{(2)}} \cdot e_l \right\|} \qquad \text{Eq. (4)}$$

At 816, the UE receives a coordinated beamformed transmission (e.g., a mmW transmission) from the plurality of BSs based on the one or more selected beams and the one or more co-phase factors. The coordinated transmission may also be received based on the determined matched filtering beam. The coordinated transmission may be received simultaneously (or near simultaneously) from the plurality of BSs. The coordinated transmission may be a same (e.g., shared, for example, same information bits) signal from the plurality of BSs.

In some examples, the coordinated transmission is received from gNBs (or RPs) with the same subarray (e.g., having a similar spatial coverage area). If the gNBs have different subarrays with different spatial coverage areas, the matched filtering based combining beam may be a choice across these different subarrays. In this case, the gNBs may coordinate to transmit in the same time-frequency resource block (RB), but may not involve the exchange of co-phase information. In some examples, instead of operating two different subarrays with the same time-frequency RB, the UE performs subarray selection.

According to certain aspects, the coordinated transmission is received from the plurality of BSs over a contiguous set of time and frequency resources based on the indicated beams and the co-phase factors. For example, $gNB_1$ can transmit in time-slot $t_1$ and $gNB_2$ can transmit in time-slot $t_2$. In this case, the coordinated transmission is processed digitally (e.g., combined across different subarrays) or in an offline manner to combine the coordinated transmissions in the contiguous set of time and frequency resources. Thus, the UE can recover the array gain from coordinated transmission. This may be beneficial for certain use cases, such as ultra-reliable low-latency communications (URLLC).

Figure 9:
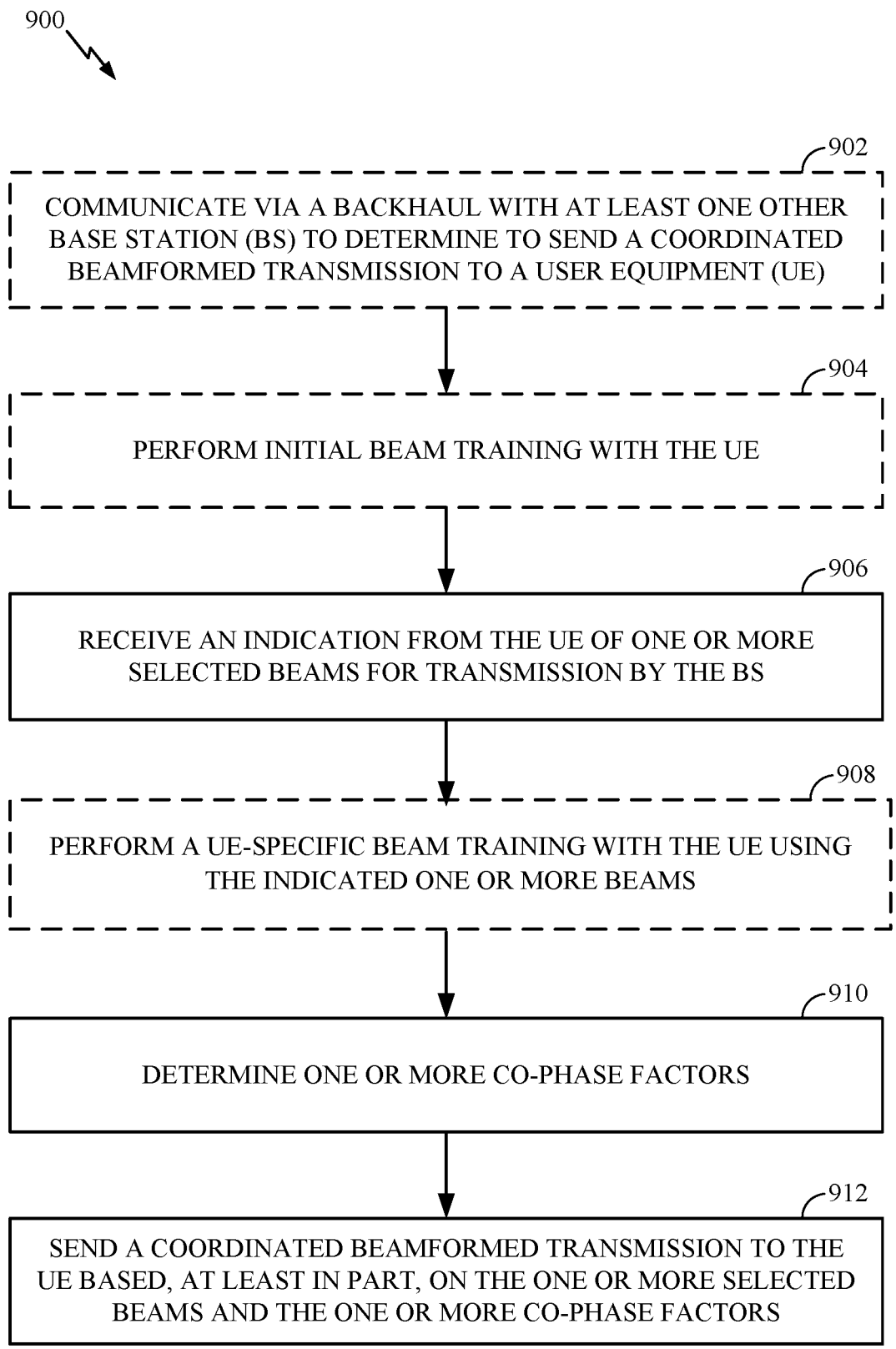
FIG. 9 is a flow diagram illustrating example operations by a BS for coordinated transmission, in accordance with certain aspects of the present disclosure.

FIG. 9 is a flow diagram illustrating example operations 900 for wireless communication, in accordance with certain aspects of the present disclosure. The operations 900 may be performed by a BS (e.g., such as a BS 110 illustrated in FIG. 1, which may be a gNB), for example, by circuitry components within the BS. The TX MIMO processor 430 of the BS 110 FIG. 4 may serve as an exemplary processor for the operations 900 described herein. Alternatively, TX MIMO processor 430 may have dedicated or shared circuitry for determining the co-phase correction factors and other processors, such as the controller/processor 440, MIMO detector 436, transmit processor 420, and/or receive processor 438 may also be used to perform a portion of the operations 900 described herein. Operations for signaling, providing, indicating, etc., can be performed by a transmit chain circuitry of the BS 110, shown in FIG. 4, which may include the controller/processor 440, data source 412, transmit processor 420, TX MIMO processor 430, modulator(s) 432a-432r, and/or antenna(s) 434a-434r. Operations for receiving can be performed by the receive chain circuitry of the BS 110 which may include the controller/processor 440, receive processor 438, MIMO detector 436, demodulator(s) 432a-432r, and/or antenna(s) 434a-434r.

The operations 900 may be complementary operations by the BS to the operations 800 performed by the UE. As shown in FIG. 9, optionally at 902, the BS may communicate with other BSs to determine to perform coordinated beamformed transmission to a UE. Optionally, at 904, the BS performs initial beam training (e.g., sends a beam swept SSS to the UE) with the UE. At 906, the BS receives an indication from the UE of one or more selected beams for transmission by the BS (e.g., based on the initial beam training). The BS may also receive an indication of signal strength (e.g., RSRP, RSRQ, SNR, and/or SINR) associated with the one or more beams.

As shown in FIG. 9, optionally at 908, the BS performs a UE-specific beam training with the UE over a contiguous set of symbols and frequency resources using the indicated beams. The BS may communicate via the backhaul with the at least one other BS to determine to perform the UE-specific beam training with the UE. At 910, the BS determines one or more co-phase factors. In some examples, the BS receives an indication of the one or more co-phase factors from the UE.

At 912, the BS sends a coordinated beamformed transmission (e.g., a mmW transmission) to the UE based, at least in part, on the one or more selected beams and the one or more co-phase factors. For example, the BS determines the beamforming for the coordinated transmission based on the indicated beams along with the indicated co-phase factors.

Figure 10:
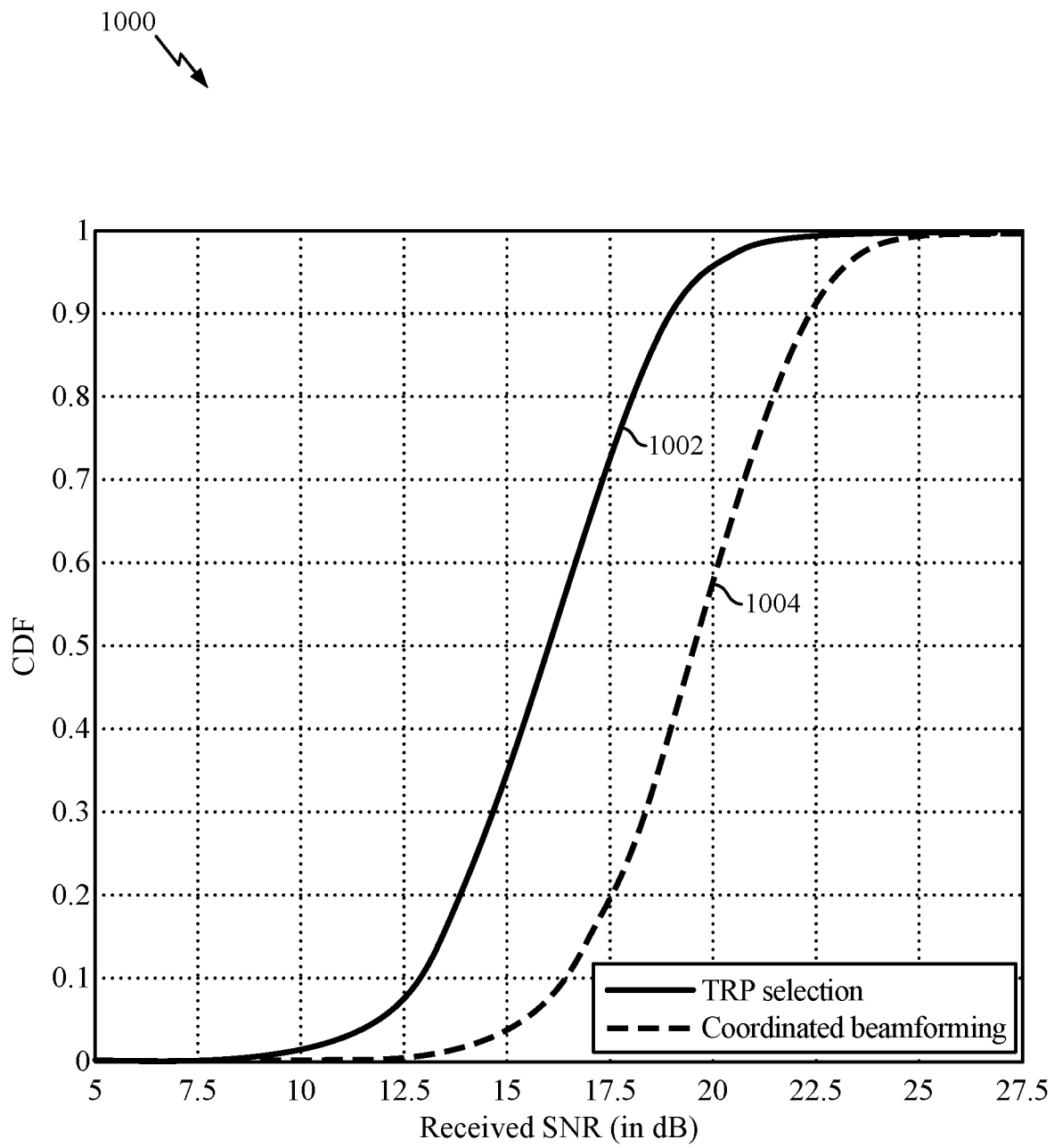
FIG. 10 is a graph showing example performance of a coordinated beam, in accordance with certain aspects of the present disclosure.
Figure 11:
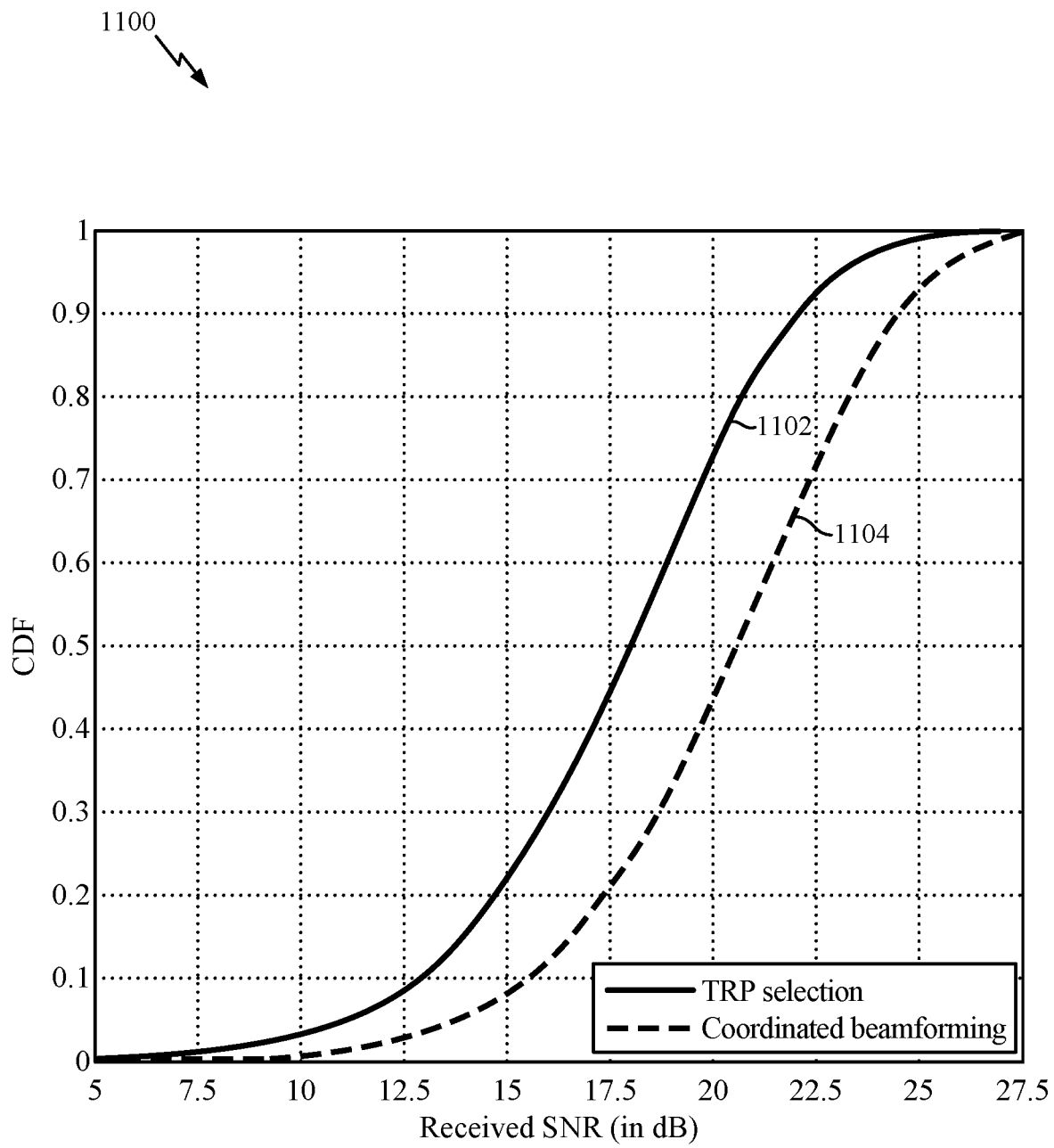
FIG. 11 is another graph showing example performance of a coordinated beam, in accordance with certain aspects of the present disclosure.

FIG. 10 is an example graph 1000 showing performance of a coordinated beamformed transmission, in accordance with certain aspects of the present disclosure. The graph 1000 shows the received SNR versus cumulative distribution function (CDF) for beam forming based on TRP selection in curve 1002 and coordinated beam in curve 1004. The graph 1000 shows an example for 16 antennas at the gNBs, 4 antennas at the UE, and 6 clusters in both channels. FIG. 11 is another example graph 1100 showing performance of a coordinated beamformed transmission, in accordance with certain aspects of the present disclosure. The graph 1100 shows the received SNR versus CDF for beam forming based on TRP selection in curve 1102 and coordinated beam in curve 1104. The graph 1100 shows an example for 2 clusters in both channels. As shown in the graphs 1000 and 1100, the coordinated beamforming shows better performance gains than the TRP selection.

Figure 12:
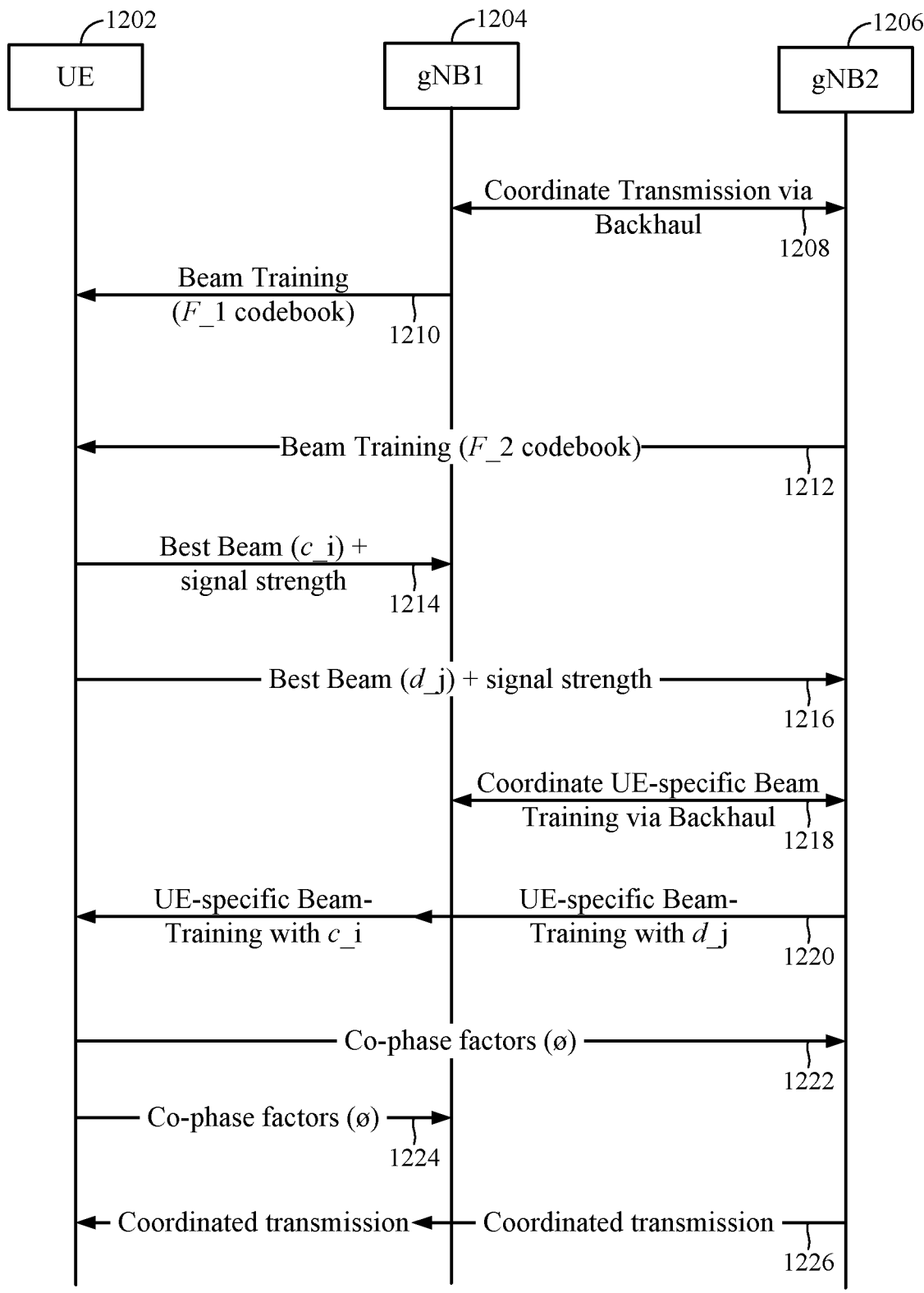
FIG. 12 is a call flow diagram illustrating signaling for coordinated transmission, in accordance with certain aspects of the present disclosure.

FIG. 12 is a call flow 1200 illustrating signaling for coordinated beamformed transmission, in accordance with certain aspects of the present disclosure. As shown in FIG. 12, the gNB1 1204 and gNB2 1206 coordinate transmission via a backhaul at 1208. The gNB1 1204 and gNB2 1206 then separately perform beam training with the UE 1202 using their respective codebooks at 1210 and 1212, respectively. Based on the beam training, the UE 1202 sends an indication of the best beam (or beam satisfying a strength/quality threshold) for the gNB1 1204 and the best beam (or beam satisfying a strength/quality threshold) for the gNB2 1206, along with the signal strength for the beam pairs at 1214 and 1216, respectively. The gNB1 1204 and gNB2 1206 may then coordinate UE-specific beam training via the backhaul, at 1218, and then perform the UE-specific beam training, at 1220, using their respective best beams (or beams satisfying a strength/quality threshold) that were indicated by the UE 1202. After the UE-specific beam training, the UE determines the co-phase factors and provides them to the gNB1 1206 and gNB2 1208 at 1222 and 1224, respectively. Based on the indicated best beams (or beamd satisfying a strength/quality threshold) and co-phase factors, the gNB1 1204 and gNB2 1206 send the coordinated transmission to the UE at 1226.

Figure 13:
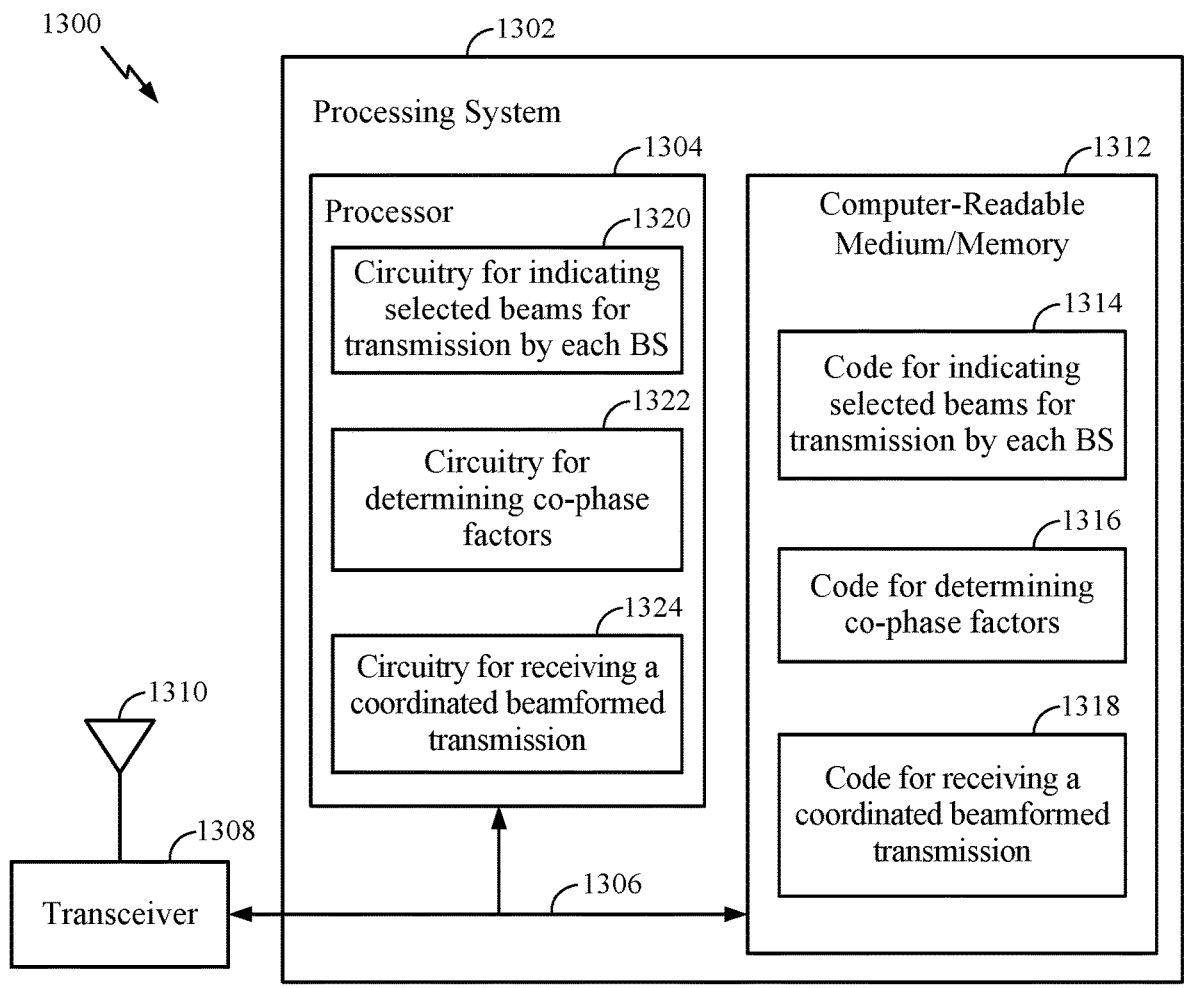
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 8. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 8, or other operations for performing the various techniques discussed herein for coordinated transmission in mmW systems. In certain aspects, computer-readable medium/memory 1312 stores code 1314 for indicating selected beams for transmission by each BS; code 1316 for determining co-phase factors; and code 1318 for receiving a coordinated beamformed transmission. In certain aspects, the processor 1304 has circuitry configured to implement the code stored in the computer-readable medium/memory 1312. The processor 1304 includes circuitry 1320 for indicating selected beams for transmission by each BS; circuitry 1322 for determining co-phase factors; and circuitry 1324 for receiving a coordinated beamformed transmission.

Figure 14:
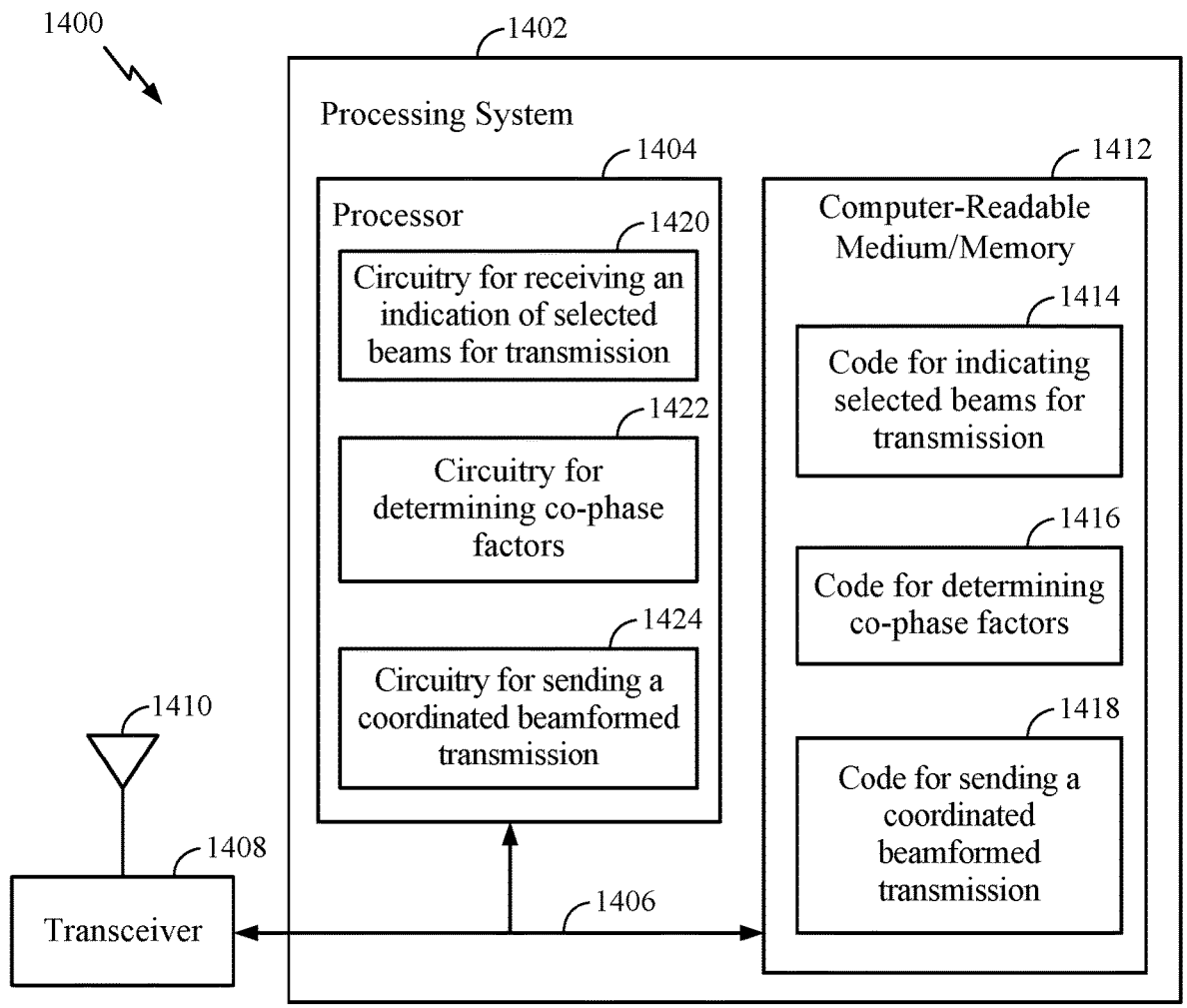
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 9. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 9, or other operations for performing the various techniques discussed herein for coordinated transmission in mmW systems. In certain aspects, computer-readable medium/memory 1412 stores code 1414 for receiving an indication of selected beams for transmission; code 1416 for determining co-phase factors; and code 1418 for sending a coordinated beamformed transmission. In certain aspects, the processor 1404 has circuitry configured to implement the code stored in the computer-readable medium/memory 1412. The processor 1404 includes circuitry 1420 for indicating selected beams for transmission by each BS; circuitry 1422 for determining co-phase factors; and circuitry 1424 for receiving a coordinated beamformed transmission.

The methods disclosed herein comprise one or more steps or actions for achieving the method described herein. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    providing an indication to a plurality of base stations (BSs) of one or more selected beams for transmission by each of the plurality of BSs;
    determining one or more co-phase factors; and
    receiving a coordinated beamformed transmission from the plurality of BSs using a combined UE receive beam, the combined UE receive beam being determined based on the one or more selected beams and the one or more co-phase factors.

2. The method of claim 1, wherein the coordinated transmission comprises the same information bits transmitted simultaneously from the plurality of BSs.

3. The method of claim 1, further comprising:
    receiving beam swept synchronization signals from each of the plurality of BSs; and
    selecting the one or more beams for single-user transmission by each of the plurality of BSs, wherein the one or more selected beams comprises beams satisfying a threshold.

4. The method of claim 1, further comprising:
    selecting a beam for receiving a transmission from each of the plurality of BSs; and
    determining a signal strength associated with beam pairs, each beam pair including one of the one or more selected beams for single-user transmission by the BSs and the corresponding selected beam for receiving a transmission from the BSs.

5. The method of claim 1, wherein determining the one or more co-phase factors comprises correlating symbol estimates for beam pairs to determine the one or more co-phase factors, each beam pair including one of the one or more selected beams and a selected beam for receiving a transmission.

6. The method of claim 1, further comprising providing an indication of the one or more co-phase factors to the plurality of BSs.

7. The method of claim 1, further comprising performing a UE-specific beam training with the plurality of BSs using beam pairs to determine the one or more co-phase factors, each beam pair including one of the one or more selected beams and a beam for receiving a transmission.

8. The method of claim 1, wherein:
    the coordinated beamformed transmission is received over a contiguous set of time and frequency resources from the plurality of BSs; and
    the method further comprises processing the coordinated beamformed transmission digitally or in an offline manner to combine the coordinated transmissions in the contiguous set of time and frequency resources.

9. A method for wireless communications by a base station (BS), comprising:

performing a first beam training procedure with a user equipment (UE), wherein the first beam training procedure includes transmitting beam swept synchronization signals to the UE;

receiving an indication from the UE of one or more selected beams for transmission by the BS, wherein the indication from the UE of the one or more selected beams is based on the first beam training procedure;

receiving one or more co-phase factors from the UE; and sending a coordinated beamformed transmission to the UE using a coordinated BS transmit beam, the coordinated BS transmit beam being determined based, in part, on the one or more selected beams and the one or more co-phase factors.

10. The method of claim 9, further comprising communicating via a backhaul with at least one other BS to coordinate the coordinated beamformed transmission.

11. The method of claim 9, wherein the coordinated transmission comprises the same information bits transmitted simultaneously from a plurality of B Ss.

12. The method of claim 9, further comprising receiving an indication from the UE of a signal strength associated with each of the one or more selected beams, wherein the indication of the signal strength comprises at least one of: a reference signal received power (RSRP), a reference signal received quality (RSRQ), a signal-to-noise ratio (SNR), or a signal-to-interference and noise ratio (SINR) associated with each of the one or more selected beams.

13. The method of claim 9, further comprising:
communicating via a backhaul with at least one other BS to coordinate a UE-specific beam training procedure with the UE; and
performing the UE-specific beam training procedure with the UE using the one or more selected beams.

14. The method of claim 9, wherein the coordinated beamformed transmission is transmitted over a contiguous set of time and frequency resources from a plurality of BSs.

15. An apparatus for wireless communications, comprising:
a transmitter configured to provide an indication to a plurality of base stations (BSs) of one or more selected beams for transmission by each of the plurality of BSs;
at least one processor coupled with a memory and configured to determine one or more co-phase factors; and
a receiver configured to receive a coordinated beamformed transmission from the plurality of BSs using a combined UE received beam, the combined UE receive beam being determined based on the one or more selected beams and the one or more co-phase factors.

16. The apparatus of claim 15, wherein the coordinated transmission comprises the same information bits transmitted simultaneously from the plurality of BSs.

17. The apparatus of claim 15, wherein:
the receiver is further configured to receive beam swept synchronization signals from each of the plurality of BSs; and
the at least one processor is further configured to select the one or more beams for single-user transmission by each BS, wherein the one or more selected beams comprise beams satisfying a threshold.

18. The apparatus of claim 15, wherein the at least one processor is further configured to:
select a beam for receiving a transmission from each of the plurality of BSs; and
determine a signal strength associated with beam pairs, each beam pair including one of the one or more selected beams for single-user transmission by the BSs and the corresponding selected beam for receiving a transmission from the BSs.

19. The apparatus of claim 15, wherein the at least one processor is configured to determine the one or more co-phase factors by correlating symbol estimates for beam pairs to determine the one or more co-phase factors, each beam pair including one of the one or more selected beams and a beam for receiving a transmission.

20. The apparatus of claim 15, wherein the transmitter is further configured to provide an indication of the one or more co-phase factors to the plurality of BSs.

21. The apparatus of claim 15, wherein the at least one processor is further configured to perform a UE-specific beam training with the plurality of BSs using the beam pairs to determine the one or more co-phase factors.

22. The apparatus of claim 15, wherein:
the coordinated beamformed transmission is received over a contiguous set of time and frequency resources from the plurality of BSs; and
the at least one processor is further configured to process the coordinated beamformed transmission digitally or in an offline manner to combine the coordinated transmissions in the contiguous set of time and frequency resources.

23. An apparatus for wireless communications, comprising:
at least one processor coupled with a memory and configured to perform a first beam training procedure with a user equipment (UE), wherein the first beam training procedure includes transmitting beam swept synchronization signals to the UE;
a receiver configured to:
receive an indication from the of one or more selected beams for transmission by the apparatus, wherein the indication from the UE of the one or more selected beams is based on the first beam training procedure; and
receive one or more co-phase factors from the UE; and
a transmitter configured to send a coordinated beamformed transmission to the UE using a coordinated BS transmit beam, the coordinated BS transmit beam being determined based, in part, on the one or more selected beams and the one or more co-phase factors.

24. The apparatus of claim 23, wherein the at least one processor is further configured to:
communicate via a backhaul with at least one other B S to coordinate a UE-specific beam training procedure with the UE; and
perform the UE-specific beam training procedure with the UE using the one or more selected beams.

* * * * *